US010178851B2

(12) United States Patent
Amicarelli

(10) Patent No.: US 10,178,851 B2
(45) Date of Patent: Jan. 15, 2019

(54) ELEVATED ANIMAL WASTE REPOSITORY

(71) Applicant: Ellen Beth Amicarelli, Warwick, RI (US)

(72) Inventor: Ellen Beth Amicarelli, Warwick, RI (US)

(*) Notice: Subject to any disclaimer, the term of this patent is extended or adjusted under 35 U.S.C. 154(b) by 0 days.

(21) Appl. No.: 15/922,018

(22) Filed: Mar. 15, 2018

(65) Prior Publication Data
US 2018/0199538 A1 Jul. 19, 2018

Related U.S. Application Data

(63) Continuation-in-part of application No. 15/349,111, filed on Nov. 11, 2016.

(60) Provisional application No. 62/333,725, filed on May 9, 2016.

(51) Int. Cl.
*A01K 1/00* (2006.01)
*A01K 1/01* (2006.01)

(52) U.S. Cl.
CPC .................. *A01K 1/0107* (2013.01)

(58) Field of Classification Search
CPC .......... A01K 1/00; A01K 1/0107; A01K 1/03; A01K 29/00
USPC ......................................... 119/161, 165–170
See application file for complete search history.

(56) References Cited

U.S. PATENT DOCUMENTS

| | | | | |
|---|---|---|---|---|
| 3,595,209 A * | 7/1971 | Parker | A01K 15/024 | 119/706 |
| 5,577,466 A * | 11/1996 | Luxford | A01K 15/025 | 119/485 |
| 5,875,735 A * | 3/1999 | Bradley | A01K 15/024 | 119/706 |
| 6,119,634 A * | 9/2000 | Myrick | A01K 1/0272 | 119/847 |
| 7,523,516 B1 * | 4/2009 | Waddell, V | A01K 1/035 | 119/847 |
| 8,020,518 B1 * | 9/2011 | Reinke | A01K 15/025 | 119/482 |
| 8,166,593 B1 * | 5/2012 | Trauernicht | B65G 69/30 | 119/847 |
| 8,776,727 B1 * | 7/2014 | Nelligan | A01K 15/027 | 119/702 |
| 2002/0189549 A1 * | 12/2002 | Writer | A01K 15/024 | 119/706 |
| 2003/0221628 A1 * | 12/2003 | Leon | A01K 15/024 | 119/28.5 |
| 2005/0268859 A1 * | 12/2005 | Bello | A01K 1/033 | 119/452 |
| 2008/0196675 A1 * | 8/2008 | Murrer | A01K 1/033 | 119/706 |
| 2009/0139461 A1 * | 6/2009 | Ritchey | A01K 1/0353 | 119/706 |

(Continued)

*Primary Examiner* — Richard T Price, Jr.
(74) *Attorney, Agent, or Firm* — Kevin M. Repper

(57) ABSTRACT

A litter box stand. The litter box stand includes a support platform having an upper surface and a lower surface. The upper surface of the support platform is configured to support a litter box. A plurality of legs are coupled to the lower surface of the support platform. The plurality of legs support the support platform in an elevated position when resting on a surface. A plurality of step platforms are coupled to the plurality of legs. The step platforms are disposed circumferentially and at a different height about the plurality of leg so that a cat may step up the step platforms and into the litter box.

10 Claims, 10 Drawing Sheets

(56) References Cited

U.S. PATENT DOCUMENTS

2013/0192486 A1\* 8/2013 Ruggiero ............... F23Q 13/00
                                                            102/215
2014/0033987 A1\* 2/2014 Hoffman ............... A01K 15/02
                                                            119/706

\* cited by examiner

ELEVATED ANIMAL WASTE REPOSITORY

CROSS-REFERENCE TO RELATED APPLICATION

This application is a continuation in part of U.S. nonprovisional application Ser. No. 15/349,111, filed Nov. 11, 2016 which claims the benefit of priority of U.S. provisional application No. 62/333,725, filed May 9, 2016, the contents of which are herein incorporated by reference.

BACKGROUND OF THE INVENTION

The present invention relates to a litter box and, more particularly, to an elevated litter box.

A litter box is an indoor feces and urine collection box for animals, such as cats, that are permitted free roam of a home but who cannot or do not always go outside to relieve themselves. Many owners of these animals prefer not to let them roam outside for fear that they might succumb to outdoor dangers, such as weather, wildlife or traffic. A litter box makes it possible to shelter pets from these risks.

Currently, litter boxes are placed on the ground and the pet owner must bend down to the litter box to clean it and care for it. This is very problematic for pet owners that have back or knee problems or are disabled and limited in mobility. Further, the litter box creates obstacles for children playing on the ground and allows other animals to access the inside of the litter box, which may cause messes.

As can be seen, there is a need for a device that allows disabled individuals to clean a litter box without having to bend over.

SUMMARY OF THE INVENTION

In one aspect of the present invention, a litter box stand comprises: a support platform comprising an upper surface and a lower surface, wherein the upper surface is configured to support a litter box; a plurality of legs coupled to the lower surface of the support platform and supporting the support platform in an elevated position when resting on a surface; and a plurality of step platforms each coupled to the plurality of legs circumferentially disposed at a different height along the plurality of legs.

In another aspect of the present invention, a litter box stand comprises: a body formed of a sidewall comprising a bottom edge configured to rest on a surface and support the litter box stand in an upright position and a top edge forming a receptacle configured to hold a litter box; and a ramp extending circumferentially from the sidewall running from the bottom edge to the top edge of the body.

These and other features, aspects and advantages of the present invention will become better understood with reference to the following drawings, description and claims.

DETAILED DESCRIPTION OF THE INVENTION

Figure 1:
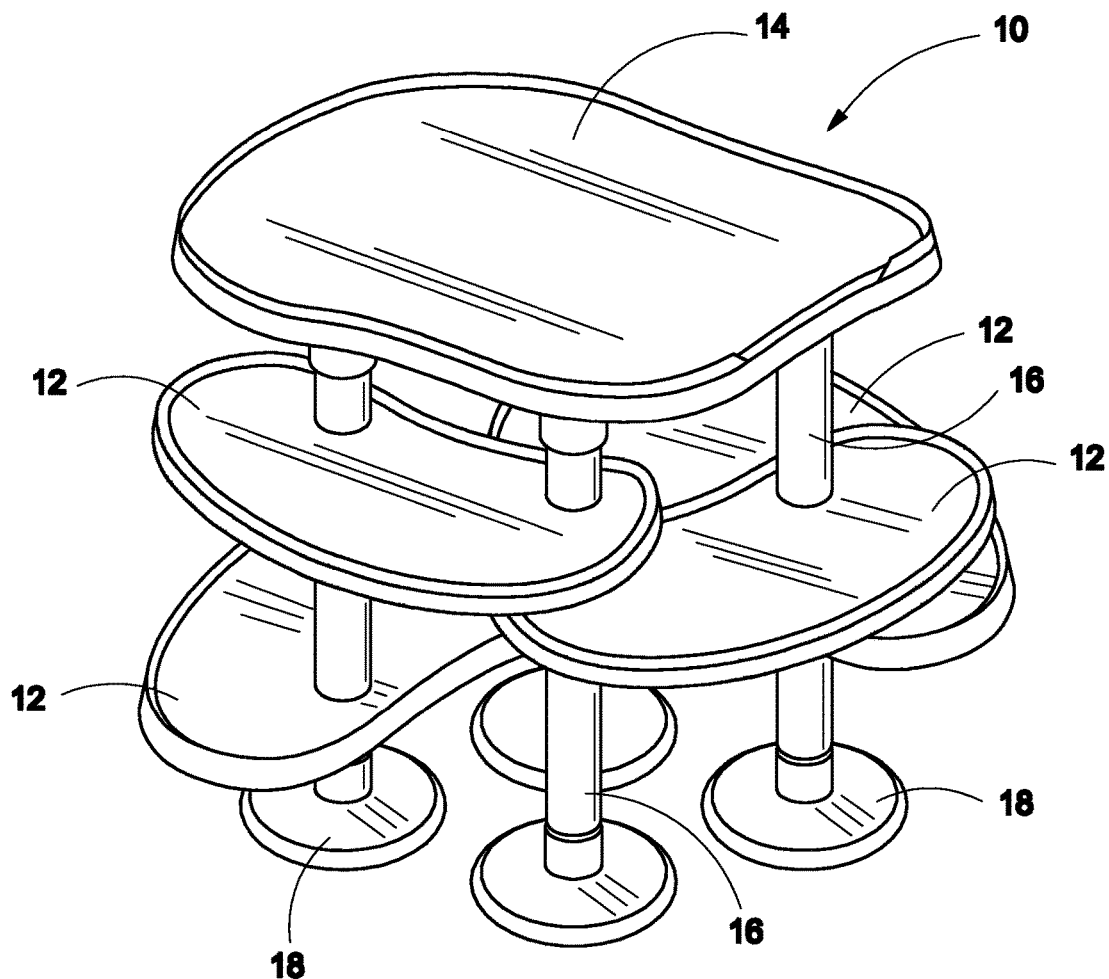
FIG. 1 is a perspective view of an embodiment of the present invention.
Figure 2:
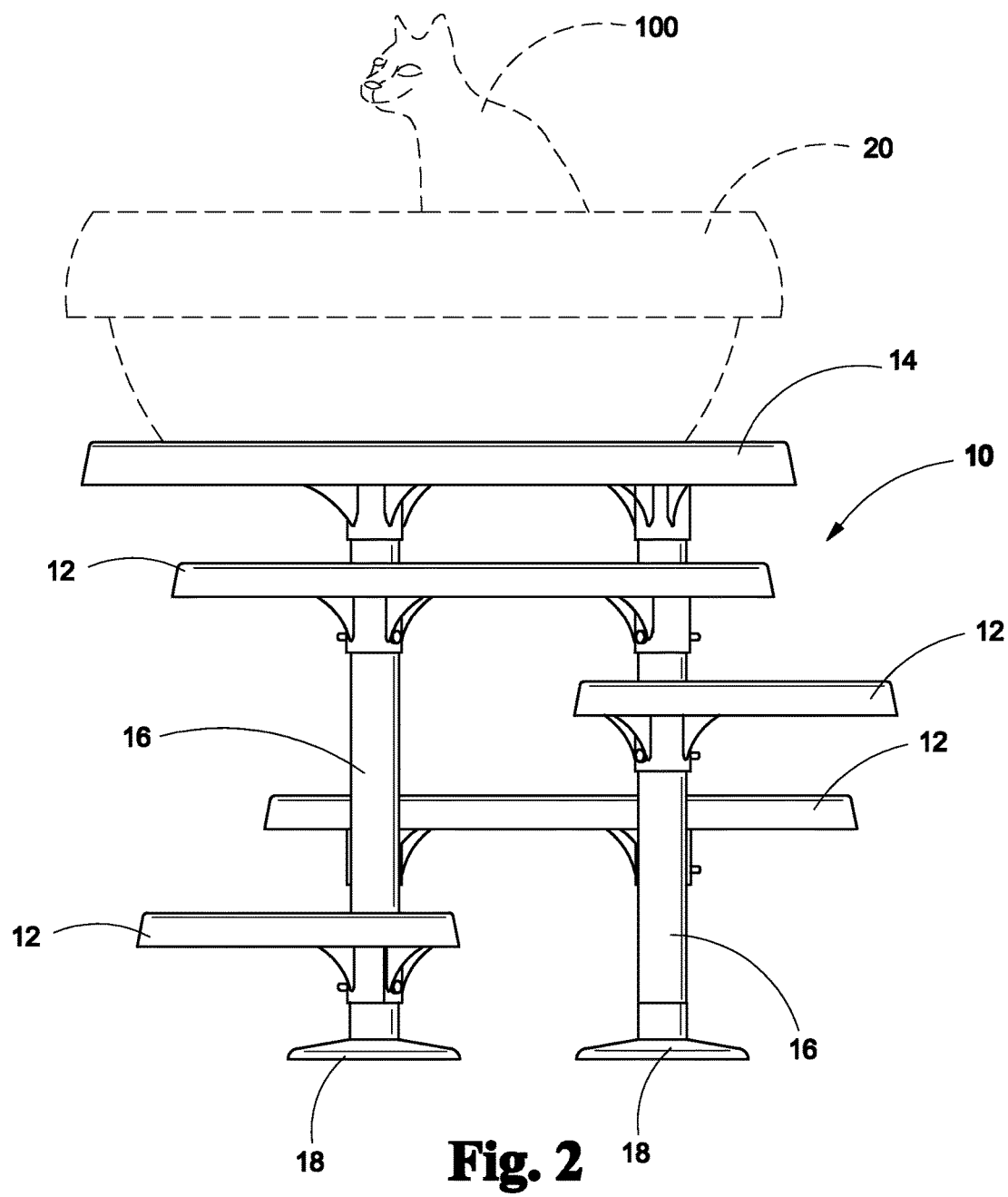
FIG. 2 is a side view of an embodiment of the present invention.
Figure 3:
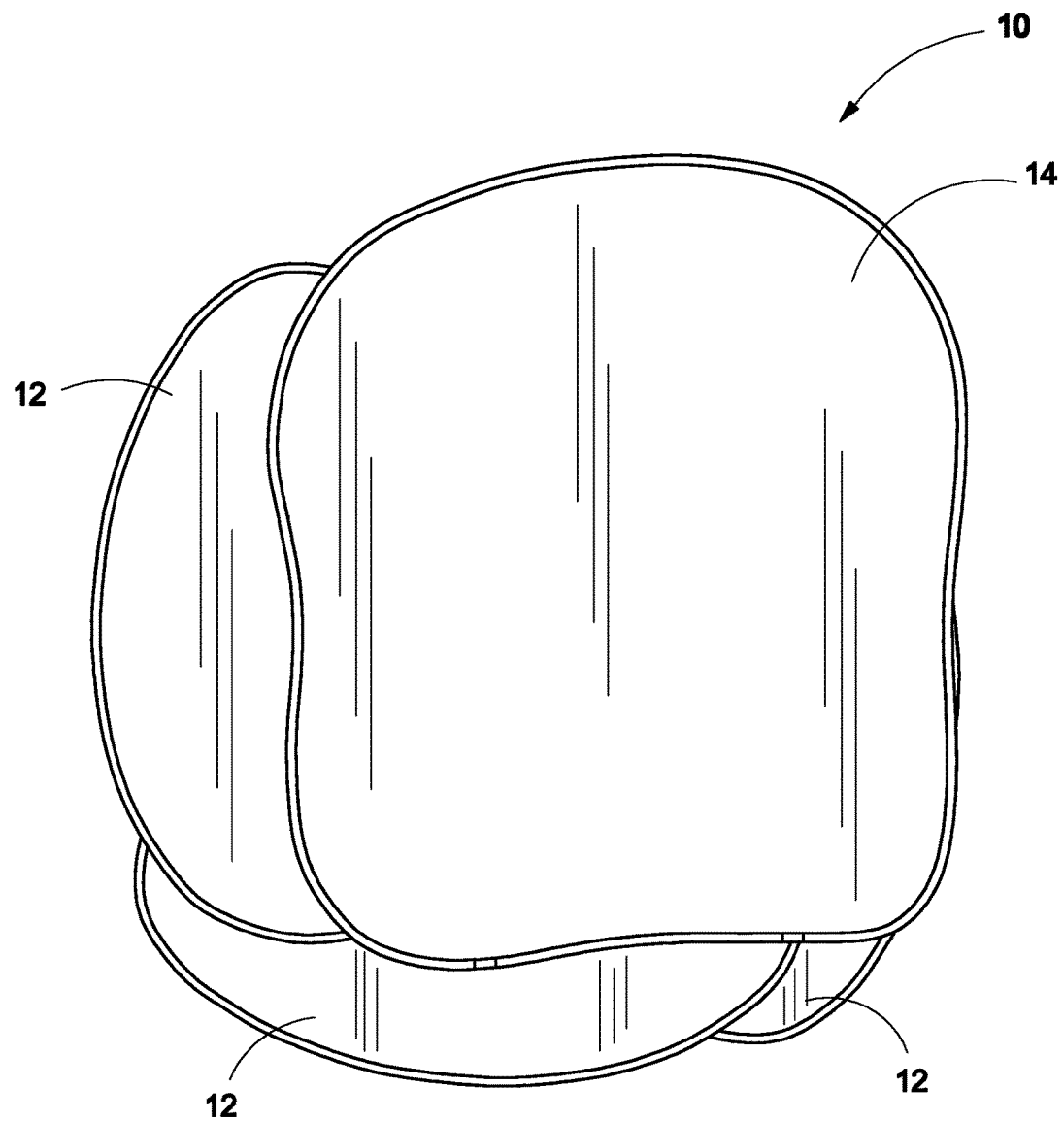
FIG. 3 is a top view of an embodiment of the present invention.
Figure 4:
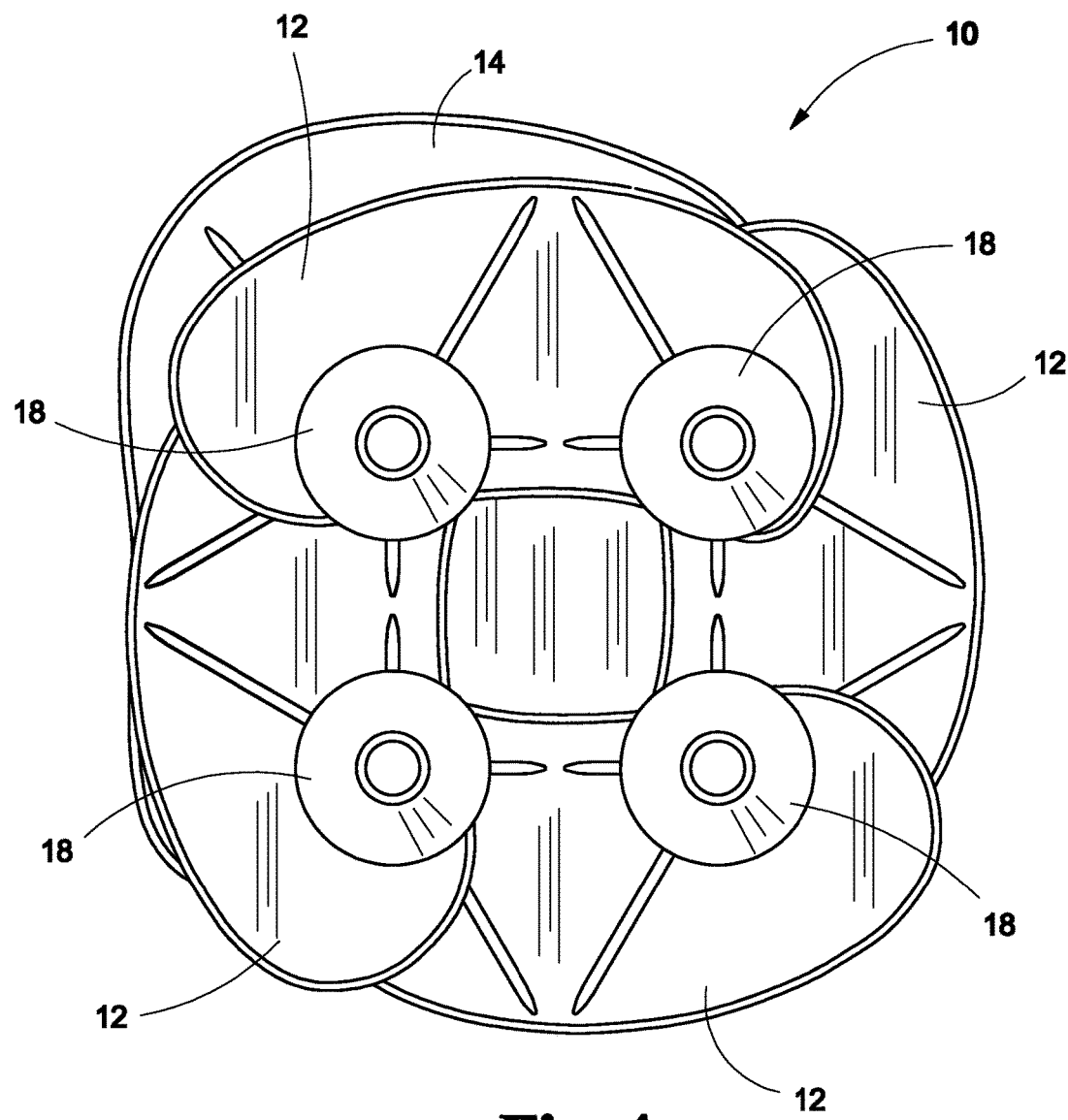
FIG. 4 is a bottom view of an embodiment of the present invention.
Figure 5:
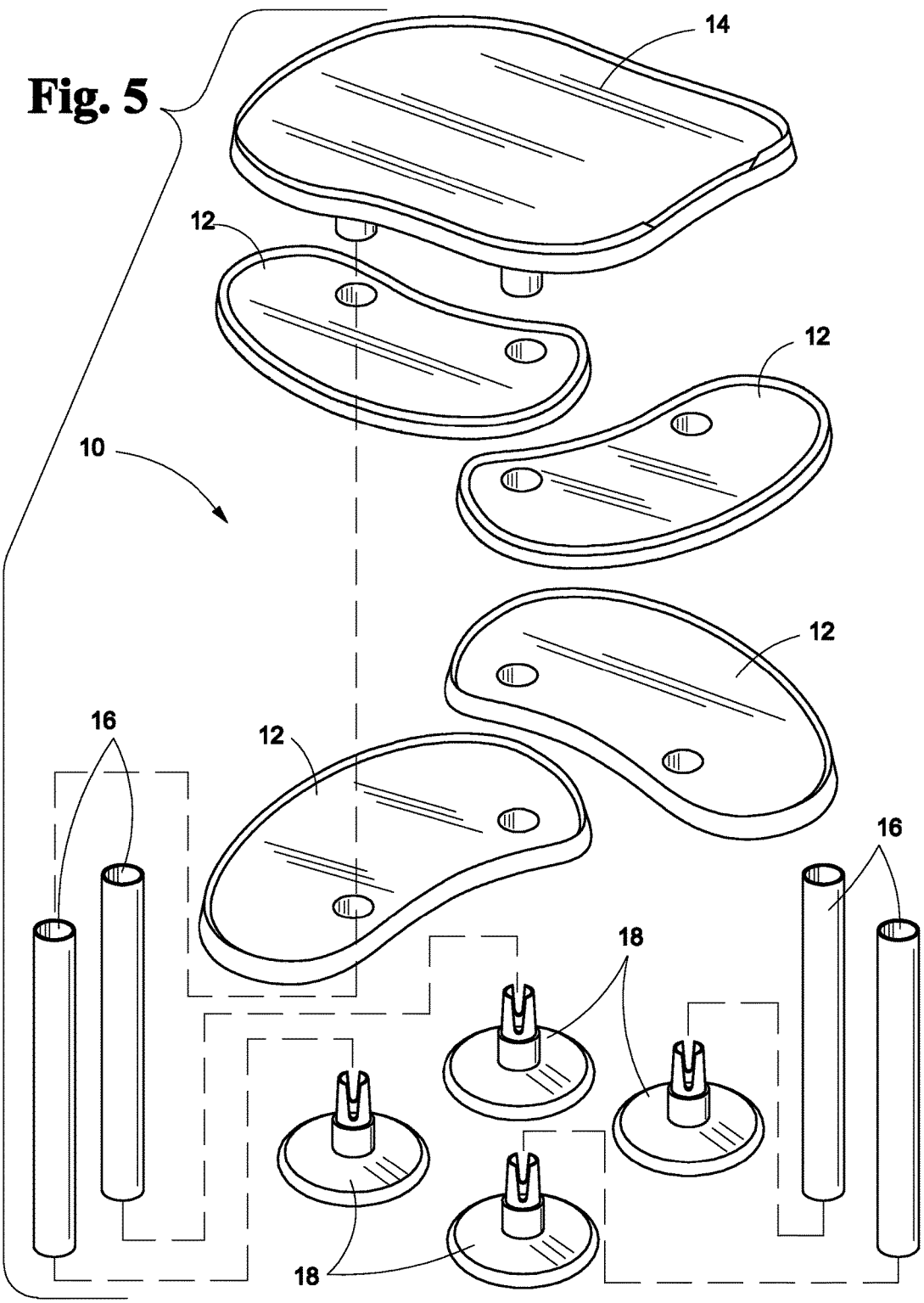
FIG. 5 is an exploded view of an embodiment of the present invention.
Figure 6:
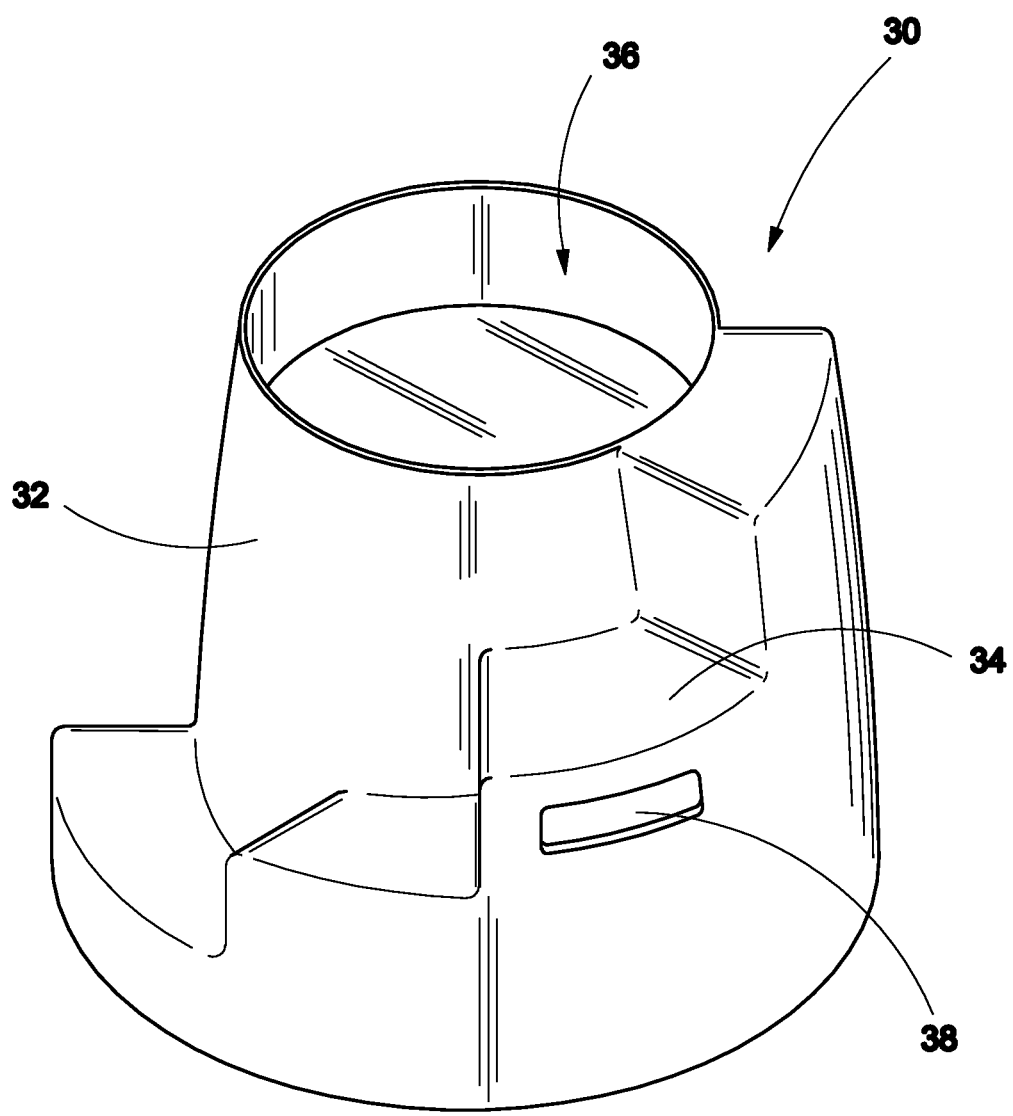
FIG. 6 is a perspective view of an embodiment of the present invention.
Figure 7:
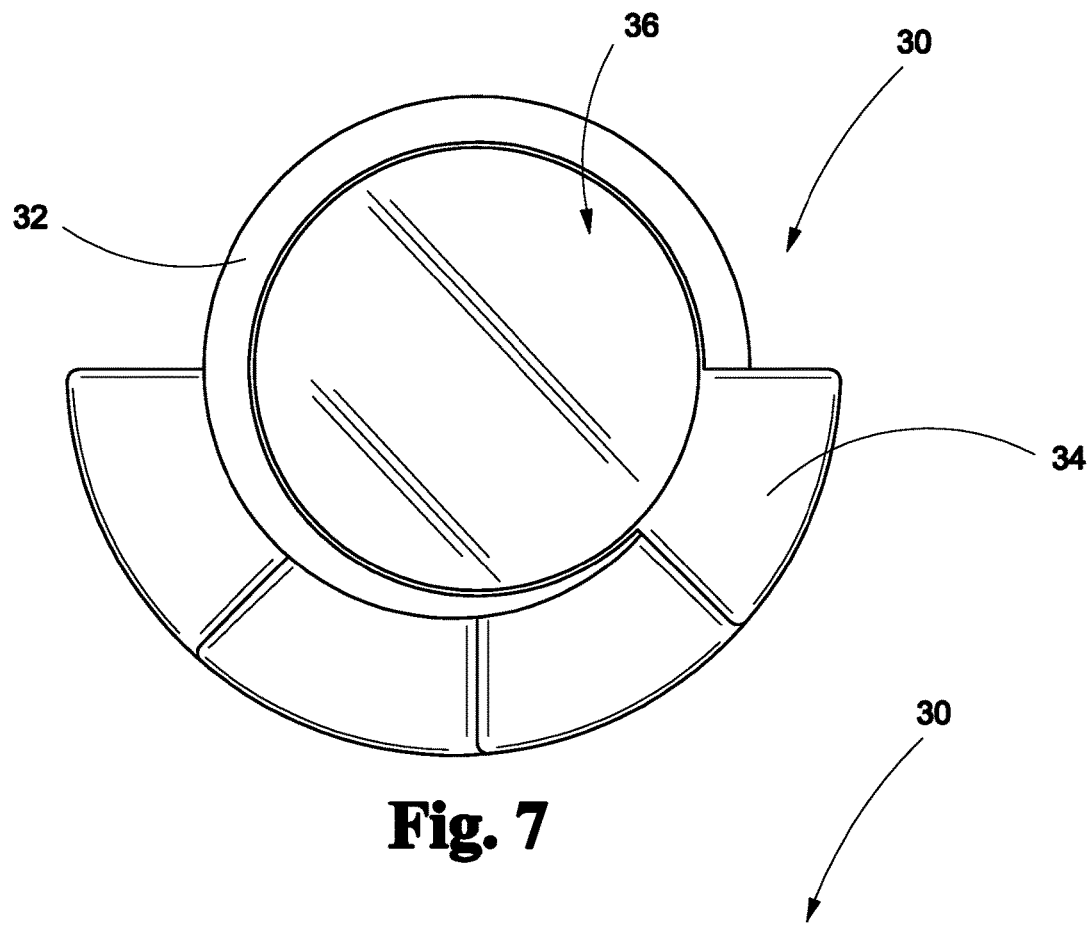
FIG. 7 is a top view of an embodiment of the present invention.
Figure 8:
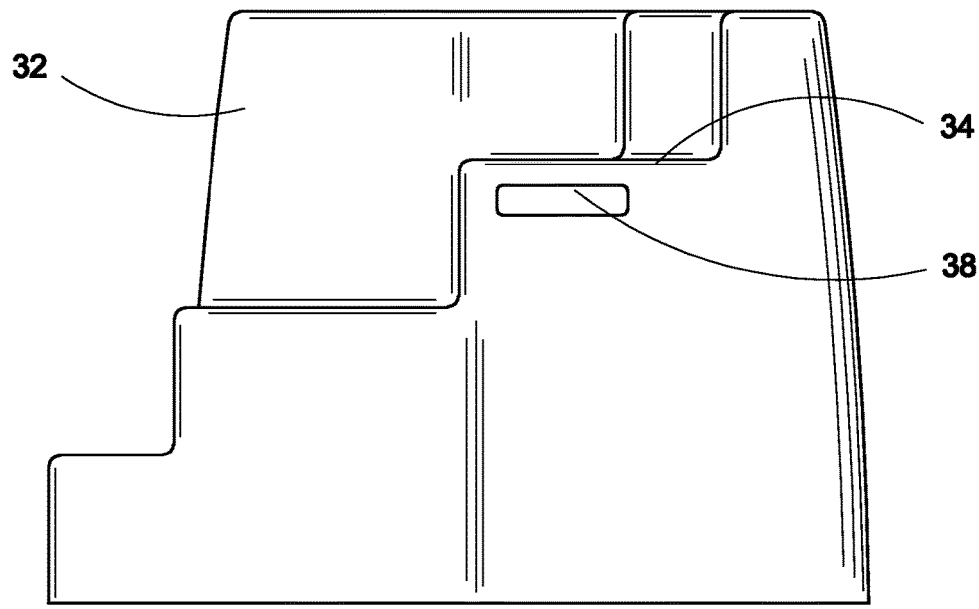
FIG. 8 is a side view of an embodiment of the present invention.
Figure 9:
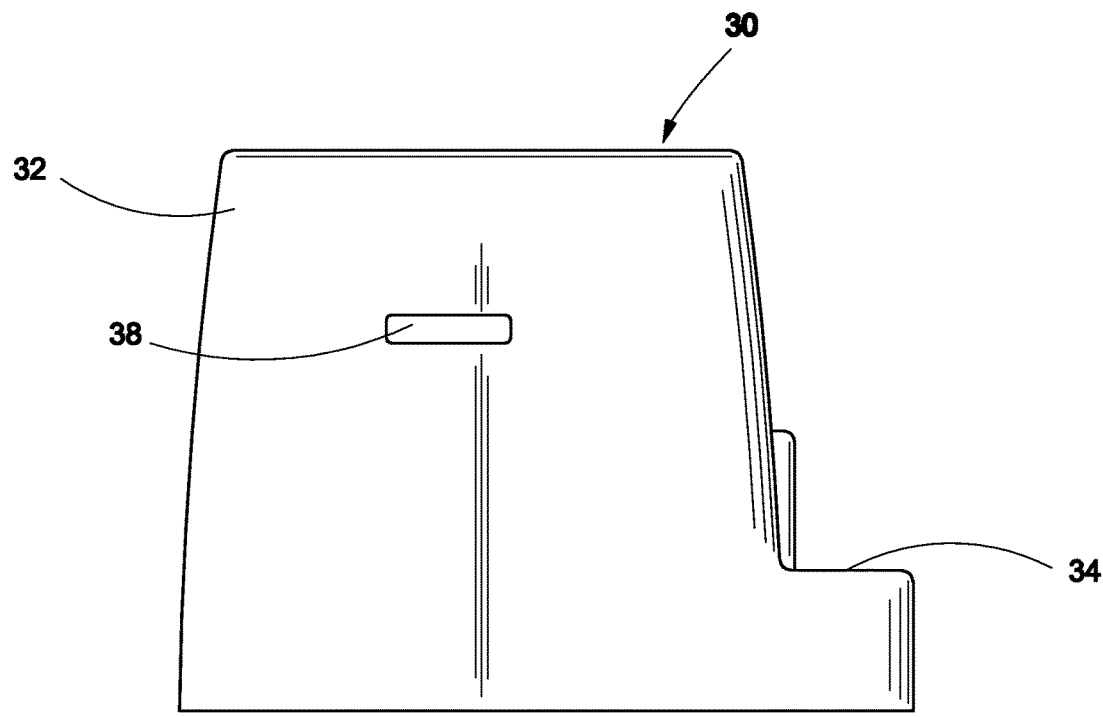
FIG. 9 is a side view of an embodiment of the present invention.
Figure 10:
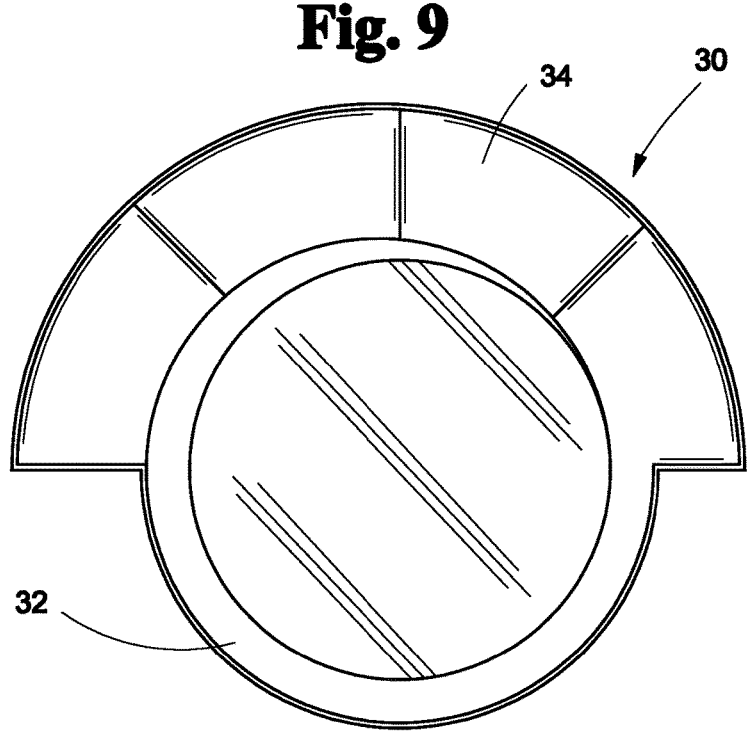
FIG. 10 is a bottom view of an embodiment of the present invention.
Figure 11:
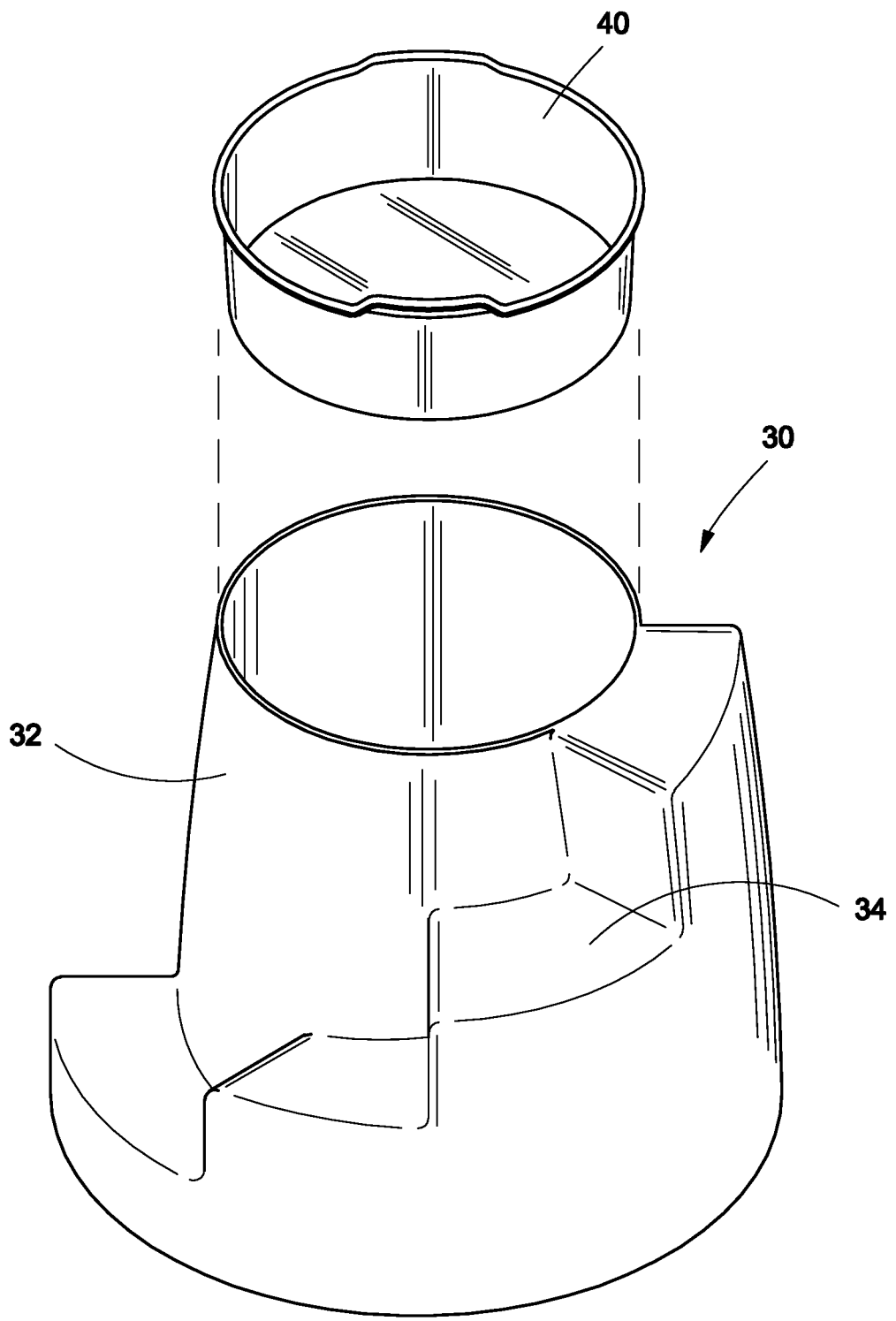
FIG. 11 is a perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a cat litter box stand supports a cat litter box at a height approximately at the waist of the pet owner. The cat litter box includes legs that bring the cat litter box to the height approximately of the waist. The present invention further includes either platforms or a climbing ramp for the cat to climb up and into the litter box. The present invention eliminates the need for the pet owner to bend down to the ground to clean and care for the litter box. Further, the present invention removes the litter box from the floor which prevents children from accessing the inside of the litter box.

Gripping material may be secured to the ramp or platform by a hook and loop fastener or adhered to the ramp using glue or other adhesives. The present invention may further include a dirty litter receptacle secured to the top and side of the stand. A plastic bag may be secured inside the receptacle and the knob on the outside is turned to a closed position causing an inside flap to close and eliminate odor from emitting from the dirty litter. In certain embodiments, a cover may be placed over the litter box. Handles may be attached to the cover and the litter box for easy removal.

Referring to FIGS. 1 through 5, the present invention includes a litter box stand 10. The litter box stand 10 includes a support platform 14 having an upper surface and a lower surface. The upper surface of the support platform 14 is configured to support a litter box 20. A plurality of legs 16 are coupled to the lower surface of the support platform 14. The plurality of legs 16 support the support platform 14 in an elevated position when resting on a surface. A plurality of step platforms 12 are coupled to the plurality of legs 16. The step platforms 12 are disposed circumferentially and at a different height about the plurality of leg 16 so that a cat 100 may step up the step platforms 12 and into the litter box 20.

The plurality of legs 16 of the present invention may include elongated rounded or squared tubes, such as elongated cylinders. In certain embodiments, the present invention may include at least three legs 16, such as four or more legs 16. The plurality of legs 16 may form a plurality of sides. For example, three legs may form three sides and four legs may form four sides. A step platform 12 may be attached at each side of the plurality of sides. For example, a plurality of step platforms 12 may include four step platforms 12, each disposed on a different side of the four sides. In such embodiments, each of the step platforms 12 may be coupled to two legs 16 of the plurality of legs 16.

Each of the support platform 14 and the step platforms 12 may include planar upper and lower surfaces. The support platform 14 may include a substantially larger surface area as compared to the step platforms 12, to properly support the litter box 20. The support platform 14 and the step platforms 12 may each include a ridge extending vertically along a periphery. The ridge better contains the litter box 20 resting on top of the support platform 14 and adds additional gripping to the step platforms 12. The support platform 14 may include a plurality of receptacles formed on the lower surface. Upper ends of the plurality of legs 16 may fit within the receptacles, thereby coupling the legs 16 to the support platform 14. Each of the step platforms 12 may include two openings that snuggly fit around the legs 16, thereby coupling the step platforms 12 to the legs 16.

The present invention may further include a plurality of feet 18. The plurality of feet 18 may be horizontally disposed, providing support the plurality of legs 16 and preventing the litter box stand 10 from falling over. In certain embodiments, the feet 18 may be disc shaped with inserts protruding from an upper surface. The inserts are sized to fit within the legs 16, thereby coupling the feet 18 to the legs 16.

The present invention may further include a second embodiment of the litter box stand 30 illustrated in FIGS. 6 through 12. The litter box stand 30 includes a body 32 formed of a rounded or squared sidewall. For example, the body 32 may be cylinder shaped, frusto conical shaped or a cuboid shape. The body 32 includes a bottom edge configured to rest on a surface and support the litter box stand in an upright position. The body 32 further includes top edge forming a receptacle 36 configured to hold a litter box 40. A ramp 34 extends circumferentially from the sidewall running from the bottom edge to the top edge of the body 32. The ramp 34 allows cats 100 to climb up the litter box stand 30 to access the litter box 40.

Figure 12:
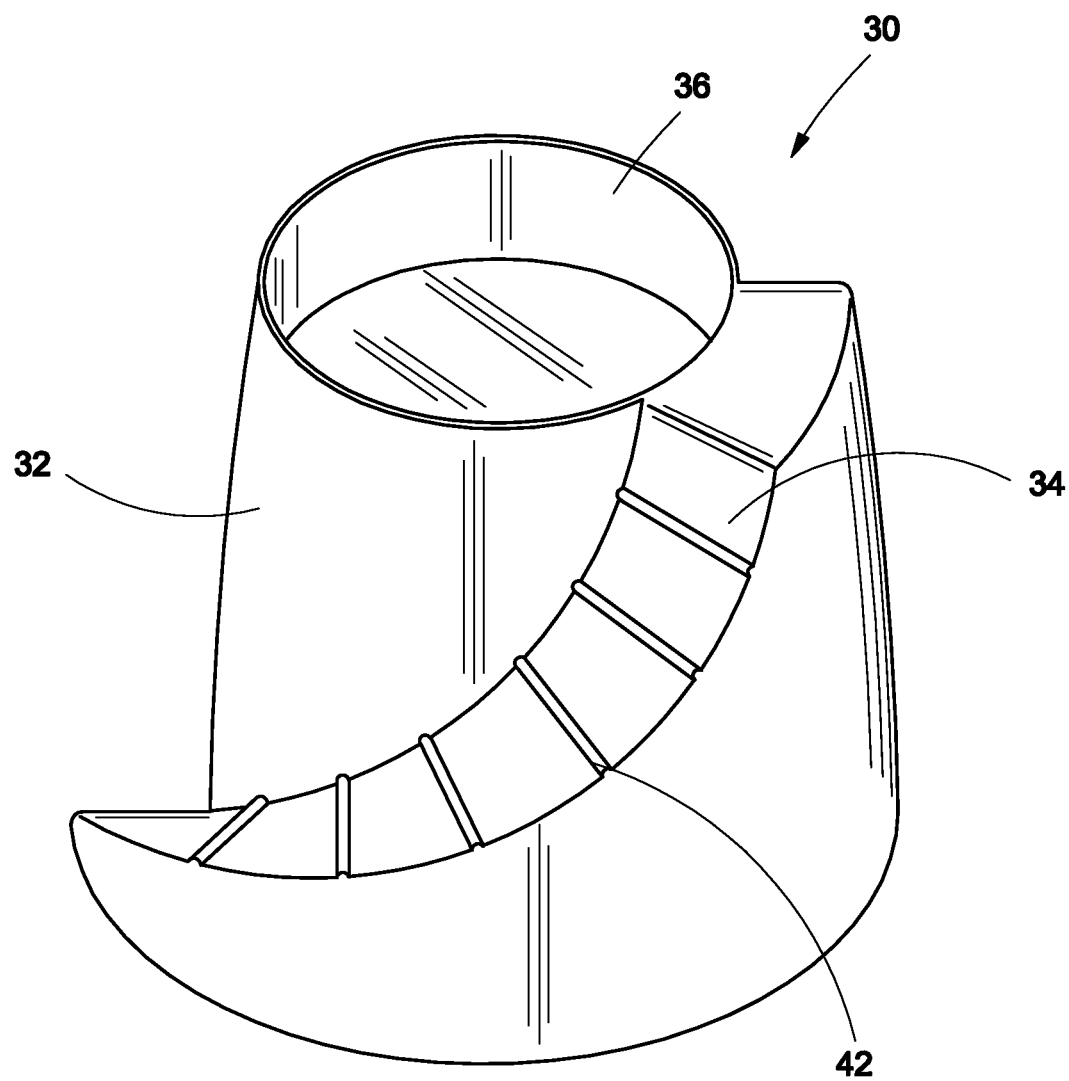
FIG. 12 is an exploded view of an embodiment of the present invention.

As illustrated in FIGS. 6 through 11, the ramp 34 may include a plurality of risers and levels forming a stepped structure. Alternatively, as illustrated in FIG. 12, the ramp 34 may include a continuous slope. To provide additional gripping, the ramp 34 having a continuous slope may include a plurality of notches 42 protruding from an upper surface of the ramp 34 and evenly spaced apart running from the bottom of the ramp 34 to the top of the ramp 34.

A plurality of litter box stands 30 of the second embodiment may stack and nest together. The litter box stand 30 may be blow molded so that the body 32 includes a hollow core and the body 32 and the ramp 34 are integral with one another. The mold may further form handle openings 38 in the body 32, the ramp 34 or both so that a user may easily carry the litter box stand 30. The receptacle 36 may include an inner wall defining a cylinder shape. The litter box 40 may have a cylinder shape that fits within the cylinder shape of the receptacle 35. The litter box 40 is a separate receptacle with handles, that is removable from the litter box stand 30 for cleaning and litter replacement.

It should be understood, of course, that the foregoing relates to exemplary embodiments of the invention and that modifications may be made without departing from the spirit and scope of the invention as set forth in the following claims.

What is claimed is:

1. A litter box stand comprising:
   a support platform comprising an upper surface and a lower surface
   a plurality of legs coupled to the lower surface of the support platform and supporting the support platform in an elevated position when resting on a surface;
   a plurality of step platforms each coupled to the plurality of legs circumferentially disposed relative one another at a different height along the plurality of legs; and
   a litter box disposed on the upper surface of the support platform, the litter box comprising a housing configured to store litter.

2. The litter box stand of claim 1, wherein the plurality of legs form four sides, wherein the plurality of step platforms are four step platforms, each disposed on a different side of the four sides.

3. The litter box stand of claim 2, wherein each of the four step platforms are coupled to two legs of the plurality of legs.

4. The litter box stand of claim 1, further comprising feet coupled to bottom ends of the plurality of legs.

5. The litter box stand of claim 4, wherein the feet comprise a disc shape.

6. A litter box stand comprising:
   a body formed of a sidewall comprising a bottom edge configured to rest on a surface and support the litter box stand in an upright position and a top edge forming a receptacle;
   a ramp extending circumferentially from the sidewall running from the bottom edge to the top edge of the body; and
   a litter box removably disposed within the receptacle of the body, the litter box comprising a housing configured to store litter.

7. The litter box of claim 6, wherein the ramp comprises a plurality of risers and levels forming a stepped structure.

8. The litter box of claim 6, wherein the ramp comprises a plurality of notches extending from an upper surface.

9. The litter box of claim 6, further comprising handle openings formed through at least one of the body and the ramp.

10. The litter box of claim 6, wherein the body and the ramp are integral.

* * * * *